March 31, 1970  A. R. UHLIG  3,503,099

PLASTIC MOLDING APPARATUS

Filed Oct. 30, 1967  4 Sheets-Sheet 1

INVENTOR.
ALBERT R. UHLIG.
BY Philip M. Rice
& W. A. Schaich
ATT'YS.

March 31, 1970     A. R. UHLIG     3,503,099

PLASTIC MOLDING APPARATUS

Filed Oct. 30, 1967     4 Sheets-Sheet 2

INVENTOR.
ALBERT R. UHLIG.
BY Philip M. Rice
& W. A. Schaich
ATT'YS.

March 31, 1970  A. R. UHLIG  3,503,099

PLASTIC MOLDING APPARATUS

Filed Oct. 30, 1967  4 Sheets-Sheet 3

INVENTOR.
ALBERT R. UHLIG.
BY Philip M. Rice
& W. A. Schaich
ATT'YS.

March 31, 1970 A. R. UHLIG 3,503,099
PLASTIC MOLDING APPARATUS
Filed Oct. 30, 1967 4 Sheets-Sheet 4

INVENTOR.
ALBERT R. UHLIG.
BY Philip M. Rice
& W. A. Schaich
ATT'YS.

United States Patent Office 3,503,099
Patented Mar. 31, 1970

3,503,099
PLASTIC MOLDING APPARATUS
Albert R. Uhlig, Toledo, Ohio, assignor to Owens-Illinois, Inc., a corporation of Ohio
Filed Oct. 30, 1967, Ser. No. 678,968
Int. Cl. B29f 1/00
U.S. Cl. 18—30      6 Claims

ABSTRACT OF THE DISCLOSURE

A plastic molding apparatus includes a displacement chamber formed by a movable orifice structure having an opening therein and a fixed mandrel having a portion within the opening of the orifice structure. The displacement chamber is filled with plasticized material supplied from a source. A mold contacts the orifice structure and moves it to reduce the volume of the chamber and force plasticized material from the chamber into the mold. The orifice structure and the mandrel have concentric conical surfaces forming boundaries of the displacement chamber and tapering at different angles so that the conical surfaces wedge plasticized material into the mold when the volume of the chamber is reduced and also form a restriction which inhibits flow of plasticized material to the source to allow a higher pressure in the displacement chamber than that of the source. The method of the invention includes the step of wedging plasticized material from the chamber into the mold by moving one of the conical surfaces toward the other and at the same time forming a restriction which inhibits the flow of plasticized material to the source.

BACKGROUND OF THE INVENTION

It has been proposed, for example, in U.S. Patent No. 3,032,810 to L. D. Soubier assigned to the present assignee to provide displacement molding apparatus in which plasticized material is forced from a displacement chamber into a mold cavity by movement of a mold member to reduce the volume of the displacement chamber. The displacement chamber communicates with a source of plasticized material, and it has been proposed to provide a valve between the displacement chamber and the source which could be shut off to trap material within the displacement chamber when the volume of the chamber is being reduced so as to build up injection pressure. Such a valve may cause uneven flow of the plasticized material, or plasticized material may become hung up on the valve creating flow problems. If the valve is simply omitted, the pressure in the displacement chamber can be increased no higher than the pressure of the source, and sometimes a higher injection pressure is needed.

Accordingly, it is an object of this invention to provide displacement molding apparatus wherein a movable structure which forms a boundry of a displacement chamber and acts to reduce the volume of the displacement chamber to inject material into a mold also serves a valving function to inhibit flow of plasticized material from the displacement chamber to a source.

Another object of the invention is to improve the injection of plasticized material from a displacement chamber into a mold in a displacement molding apparatus.

A further object of the invention is to provide generally conical surfaces on structures which define a displacement chamber which conical surfaces are tapered at different angles so as to exert a wedging action on plasticized material as it is being forced from the displacement chamber into a mold by reduction of the volume of the displacement chamber.

Another object of the invention is to both wedge plasticized material from a displacement chamber with differently tapered conical surfaces and also to form a restriction in the flow path of plasticized material by relatively moving the conical surfaces toward each other.

Other objects of this invention will appear in the following description and appended claims reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
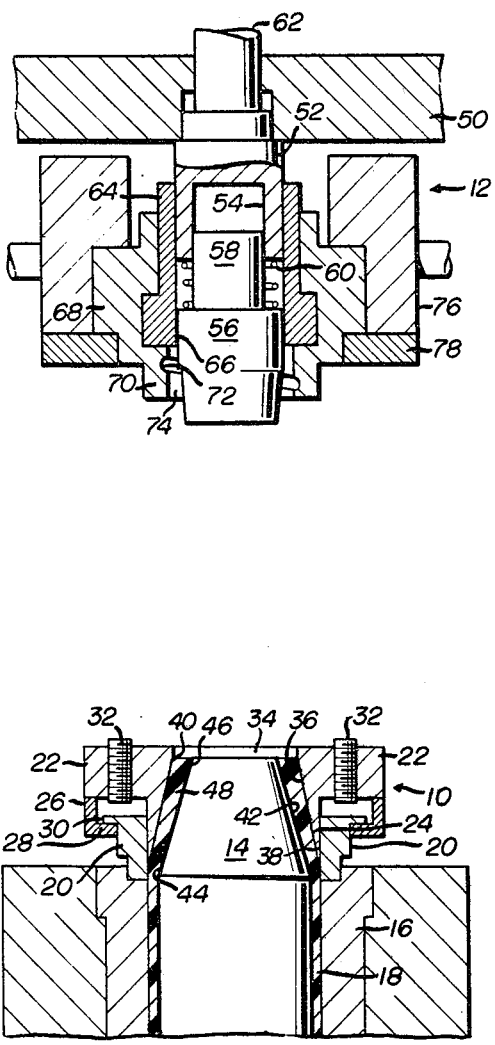
FIGURE 1 is a cross-sectional view of displacement molding apparatus in accordance with one embodiment of the invention and illustrates the apparatus in its condition at the beginning of the method of the invention.

As shown on the drawings:

Referring first to FIGURE 1, numeral 10 generally designates an injection head, and numeral 12 generally designates a mold which is in a raised position spaced above the injection head. The injection head 10 includes a fixed mandrel 14 which is located inside a casing 16 and spaced radially from the casing to form a passageway 18 which communicates with a source of plasticized material such as an ordinary plasticizer-extruder (not shown). Attached to the casing structure 16 is a collar 20 which merely forms a vertical extension of the casing.

An annular orifice structure 22 is located above the collar 20 and has a depending portion 24 which fits slidably inside the annular collar 20. Thus, the annular orifice structure 22 is supported for vertical movement relative to collar 20. Orifice structure 22 has a finger 26 attached to and extending downwardly therefrom, and finger 26 has a horizontal portion 28 which engages under a lip 30 of the collar 20. Lip 30 acts as a stop which defines the upper limit of movement of the orifice structure 22. Set screws 32 extend vertically through orifice structure 22 in registry with the top of collar 20, and when orifice structure 22 is moved downwardly, the lower ends of set screws 32 abut against the top of collar 20 to halt movement of orifice structure.

Orifice structure 22 has a central opening 34 extending through it, and this opening is bounded by a conical surface 36. Surface 36 tapers inwardly from a larger diameter portion 38 at the bottom end thereof to a smaller diameter portion 40 at the top end thereof.

Mandrel 14 has its top end thereof within the opening 34 and has an exterior conical surface 42 in confronting spaced relation from the conical surface 36 of orifice structure 22. Conical surface 42 also tapers from a larger diameter portion 44 thereof at its bottom end to a smaller diameter portion 46 at its top end thereof, and thus tapers in the same sense as conical surface 36 of orifice structure 22. However, it may be noted that the two conical surfaces 36 and 42 taper at different angles and diverge from each other from the narrowly spaced portions 38 and 44 at the bottom ends thereof to the more widely spaced portions 40 and 46 at the top ends thereof. The space 48 between the two conical surfaces 36 and 42 is the displacement chamber of the apparatus, and this chamber is in communication at one end thereof with the passageway 18 leading ot the source of plasticized material, and is in communication at the other end thereof with the atmosphere outside injection head 10.

As will be explained further in connection with the description of the operation of the apparatus, the orifice structure 22 is moved relative to mandrel 14 to move conical surface 36 toward conical surface 42, thereby reducing the volume of displacement chamber 48 and forcing plastic material into the mold 12. The purpose of the diverging relationship of surfaces 36 and 42 is to wedge plasticized material from chamber 48 into mold 12 and also to form a restriction where chamber 48 communicates with passageway 18 to inhibit flow of plasticized material back towards the source, thus allowing a higher pressure in the displacement chamber 48 than that of the source. In a specific embodiment, surface 42 is at an angle of 59° from a horizontal reference, and surface 36 is at an angle of 62° from a horizontal reference.

Mold 12 is attached to a head 50 which can be raised and lowered by a piston and cylinder device which is not shown in the drawings. Mold 12 includes a central core 52 having recess opening 54 therein, and a plunger 56 having a stem 58 fitting slidably within recess opening 54 for guiding the motion of plunger 56. The plunger is biased by a coil spring 60 located between core 52 and plunger 56. Core 52 is attached to head 50 as by means of a screw 62.

There is a sleeve 64 around core 52 and plunger 56, the inner surface 66 of which tapers inwardly slightly to hold plunger 56 within sleeve 64 when plunger 56 is in its fully extended position as in FIGURE 1. Sleeve 64 is affixed to core 52 by suitable means not shown.

Around sleeve 64 there is a neck ring 68 which has a lower annular portion 70 including an inner surface 72 spaced from and confronting the outer surface of plunger 56 where it projects from sleeve 64. The space 74 between neck ring portion 70 and plunger 56 is the finish molding space of the mold 12, and plasticized material is injected into this space in the operation of the apparatus to form the neck or finish portion of an article.

The mold 12 is completed by housing parts 76 and 78 provided around the outside of neck ring 68 and attached to the neck ring by any suitable means.

The apparatus including injection head 10 and mold 12 carries out the method of the invention, and it will be understood that the various views of the drawings illustrate the condition of the apparatus at different steps of the method. In the starting condition of the apparatus, mold 12 is in an initial position spaced above injection head 10. Displacement chamber 48 is filled with plasticized material to its top as shown in FIGURE 1, and orifice structure 22 is in its fully raised position.

Figure 2:
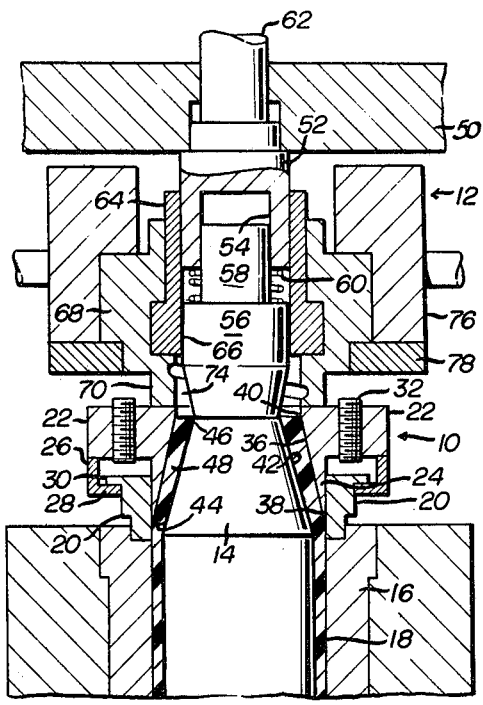
FIGURE 2 is a cross-sectional view similar to FIGURE 1 showing a mold of the apparatus after it has been brought into contact with a movable orifice structure.

Mold 12 is lowered to bring plunger 56 into contact with the tip of mandrel 14, and to bring neck ring portion 70 into contact with the top surface of orifice structure 22. The condition of the apparatus after this initial movement of mold 12 is shown in FIGURE 2. It may be seen that in this condition of the apparatus, displacement chamber 48 communicates with neck space 74 at the top end of chamber 48 so that there is a clear passage for injection of plasticized material from chamber 48 into neck space 74.

The downward movement of mold 12 is continued to force orifice structure 22 downward until the end of screw 32 abuts against the top of collar 20. During this movement of orifice structure 22, mandrel 14 and plunger 56 remain stationary while neck ring 68 moves relative to plunger 56 with core 52 moving relative to stem 58 and spring 60 being compressed to permit this relative movement. During the downward stroke of orifice structure 22, conical surface 36 moves toward conical surface 42 and thus reduces the volume of displacement chamber 48 to express plasticized material from chamber 48 into neck space 74.

Figures 3, 4:
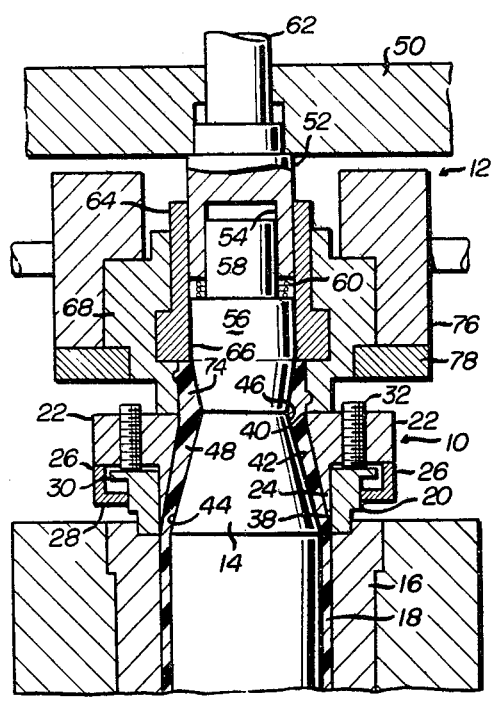
FIGURE 3 is another cross-sectional view of the apparatus in a condition where the displacement chamber of the apparatus has been reduced in volume to inject material into the mold.
FIGURE 4 shows the mold being withdrawn from the orifice structure to extrude a plastic tube.

The condition of the apparatus after the downward stroke of orifice structure 22 is shown in FIGURE 3. It may be seen that due to the different angles of taper of conical surfaces 26 and 42, plasticized material has been wedged by these conical surfaces out of chamber 48 into neck space 74. Also, the bottom end 38 of orifice structure 22 has moved substantially closer to the bottom end 44 of conical surface 42, and there is a restriction between surface portion 44 and surface portion 38. This restriction inhibits the flow of plasticized material from chamber 48 back through passage 18 to the source of plasticized material, and thus allows an injection pressure to build up in chamber 48 which exceeds the pressure of the source of plasticized material. This is quite important from the standpoint of providing injection of plasticized material into the neck space 74.

Head 50 and mold 12 are then raised, and orifice structure 22 follows the mold 12 upward due to the pressure of plasticized material in chamber 48 until projecting portions 28 abut against lip 30 of collar 20. Plasticized material is continuously dispensed from the source through passageway 18 into chamber 48, and as the mold 12 is raised away from orifice structure 22, a tube 80 of plasticized material is extruded from chamber 48 integral with the material filling the neck space 74. The condition of the apparatus at this stage where the tube is being formed is illustrated in FIGURE 4. The mold 12 is raised until it reaches its uppermost position as shown in FIGURE 1, and then the mold is halted.

Next, blow molds 82 are closed on the tube 80 and fit with the neck ring 68 such that the tube 80 remains integral with the neck formed in neck space 74. The bottom of the blow molds 82 sever the tube 80 and pinch the severed portion shut at its bottom end. A blowing medium such as air is then introduced through a hollow portion of plunger 56 into the tube 80 to expand the tube to conform with the blow molds. The blow molds 82 and the neck ring 68 are then opened laterally to release the molded article for ejection from the apparatus. The mold 12 and the injection head 10 are then ready to begin another cycle.

Figure 6:
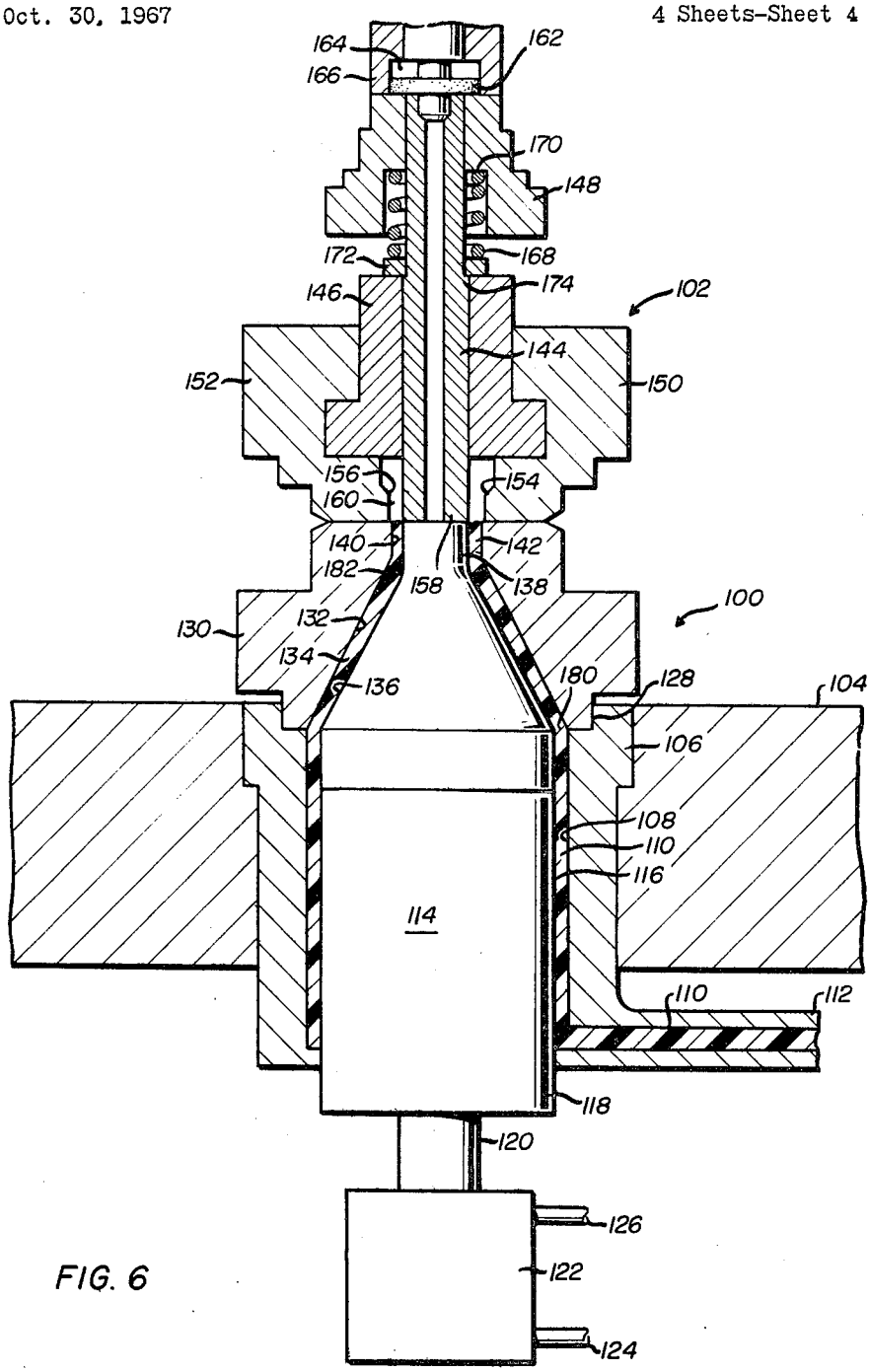
FIGURE 6 is a sectional view of another embodiment of the invention showing a fixed orifice structure and a movable mandrel.

FIGURE 6 is a sectional view of another embodiment of the invention in which a fixed orifice structure and a movable mandrel are employed to displace plasticized material into a mold space. The apparatus includes an injection head 100 and a movable mold 102. Injection head 100 includes a base 104 having a tubular sleeve 106 affixed therein, the inner surface 108 of sleeve 106 forming one boundry of a passage 110 which communicates through a conduit 112 with a source of plasticized material, not shown. Within sleeve 106 is a vertically movable mandrel 114 having a cylindrical surface 116 forming the inner boundry of the passage 110. The bottom end 118 of mandrel 114 projects through the bottom of sleeve 106 and is connected to a piston 120 and a hydraulic or pneumatic cylinder 122. Cylinder 122 has a conduit 124 through which fluid is introduced to move piston 120 and mandrel 118 upwardly, and has another conduit 126 through which fluid is introduced to move piston 120 and mandrel 118 downwardly.

Affixed to the top of sleeve 106 as by a threaded connection at 128 is a fixed orifice bushing 130. Orifice bushing 130 has a conical surface 132 defining one boundry of a displacement chamber 134 which communicates with the passageway 110 as shown. The inner boundry of displacement chamber 134 is a conical surface 136 formed on the upper end of mandrel 114. Two conical surfaces 132 and 136 confront each other and taper in the same sense to define displacement chamber 134 between them.

The upper tip 138 of mandrel 114 is cylindrical as shown, and the top portion of orifice bushing 130 has an annular cylindrical surface 140 confronting tip 138 so that an annular orifice 142 is formed at the top orifice bushing 130. Thus, mandrel 114 can be moved upward to bring surfaces 132 and 136 closer together and thus reduce the volume of displacement chamber 134 without changing the size of the orifice 142.

The movable structure 102 includes a core pin 144 movable freely within a pair of sleeves 146 and 148. The latter sleeves are affixed to a head structure (not shown) so that the entire structure 102 may be moved vertically relative to the fixed orifice bushing 130.

Split neck ring halves 150 and 152 are separably affixed to sleeve 146, and the neck ring halves have inner semicircular surfaces 154 and 156 which are in confronting spaced relation with the tip 158 of core 144. A finish molding space 160 is thus formed between surfaces 154, 156 and the tip 158 of core 144. Mold space 160 communicates with displacement chamber 134 when movable mold structure 102 is down and neck ring halves 150 and 152 are in contact with orifice bushing 130 in the manner shown in FIGURE 6.

When movable structure 102 is in a raised position, tip 158 of core 144 projects slightly beyond the lower end of neck ring halves 150 and 152. When structure 102 is lowered the tip 158 contacts mandrel tip 138, and sleeves 146 and 148 together with rings 150 and 152 move downwardly relative to core 144 to bring the bottom of rings 150 and 152 into contact with orifice bushing 130. This relative movement is accommodated by providing a flange 162 on core 144 which moves in a space 164 inside a cap 166 attached to sleeve 148. Core 144 is biased by a coil spring 168 supported at its upper end by a recessed surface 170 in sleeve 148, and supported at its lower end by a collar 172 abutting against a shoulder 174 on core 144.

Referring again to the conical surfaces 132 and 136, it may be seen that these surfaces taper at different angles so that these surfaces are closer together at 180 where displacement chamber 134 merges with passageway 110 than they are at 182 where displacement chamber 134 merges with orifice bushing 142. As in the case of the first embodiment described previously, surface 132 may taper at an angle of about 62 degrees from a horizontal reference, and surface 136 may taper at an angle of about 59 degrees with respect to a horizontal reference. Thus, when mandrel 114 is moved upwardly, diverging surfaces 132 and 136 will wedge plasticized material from chamber 134 into mold space 160, and at the same time a restriction will be formed at 180 which allows a higher pressure to build up in the displacement chamber than the pressure provided by the source of plasticized material.

Figure 5:
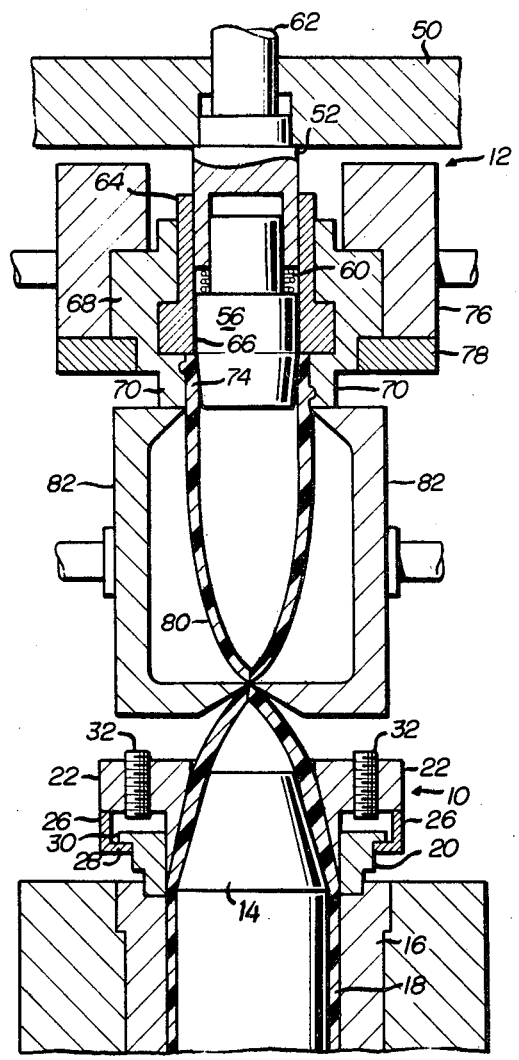
FIGURE 5 shows blow molds closed on the tube so that the tube may be expanded by blowing to form a finished article.

In the use of the apparatus of FIGURE 6, movable structure 102 is initially in a raised position above orifice bushing 130. Structure 102 is lowered to bring core tip 158 into contact with mandrel tip 138 and then to bring neck ring halves 150 and 152 into contact with orifice bushing 130. Mold space 160 then communicates with displacement chamber 134. Cylinder 122 is then actuated to move piston 120 and mandrel 114 upwardly to wedge plasticized material from chamber 134 into mold space 160 and also to form a restriction at 180. Structure 102 is then moved upwardly while plasticized material is dispensed through passageway 110 and chamber 134 to extrude a tubular plastic parison integral with the material filling neck mold space 160. When movable structure 102 reaches an uppermost position it is halted. Blow molds (not shown) are then closed on the parison in the manner illustrated in FIGURE 5 to pinch the parison shut at one end, and air is then injected into the parison to expand it against the interior of the blow molds. At some convenient time in the extrusion and blowing phases of the operation, mandrel 114 is lowered to its initial position.

Having thus described my invention, I claim:

1. In a plastic molding apparatus having a displacement chamber in communication with a source of plasticised material, the displacement chamber being defined by first and second structures movable relative to each other to reduce the volume of said chamber, said apparatus further including mold means having a first position spaced from said first and second structures and a second position in contact with at least one of said first and second structures wherein said mold means is in communication with said chamber for displacement of plasticized material from said chamber into said mold means, the improvement of a first generally conical surface on said first structure forming a boundary of said chamber and a second generally conical surface on said second structure forming another boundary of said chamber confronting said first conical surface and spaced therefrom, said conical surfaces tapering at different angles and diverging from each other from a narrow spacing adjacent one end of said chamber to a wider spacing adjacent another end of said chamber where said chamber communicates with said mold means, so that said conical surfaces wedge plasticized material from said chamber into said mold means during the reduction in volume of said chamber by relative movement of said structures.

2. A plastic molding apparatus as claimed in claim 1 in which said first structure is a movable orifice bushing having an opening therein bounded by said first conical surface, and said second structure is a fixed mandrel having a portion located within said opening of said orifice bushing which portion has said second conical surface thereon, said mold means being engageable with said orifice bushing to move the same relative to said mandrel to thereby reduce the volume of said chamber and wedge plasticized material from said chamber into said mold means.

3. A plastic molding apparatus as claimed in claim 2 and further including means for moving said mold means in one direction toward said orifice bushing and in the reverse of said one direction away from said orifice bushing, said mold means being filled with plasticized material during the movement thereof in said one direction and drawing plasticized material from said chamber during movement thereof in said reverse direction to extrude a tube integral with the material in the mold, and blow mold means closable on said tube to accommodate blowing of said tube to the configuration of said blow mold means.

4. In a plastic molding apparatus having a displacement chamber in communication with a source of plasticized material, the displacement chamber being defined by a fixed structure forming one wall of said chamber and a movable structure forming another wall of said chamber, said apparatus further including mold means having an initial position spaced from said movable structure and movable to contact said movable structure and displace the same toward said fixed structure to reduce the volume of said chamber and thereby force plasticized material from said chamber into said mold means, said mold means being in communication with said chamber when said mold means is in contact with said movable structure, the improvement of a first generally conical surface on said fixed structure forming a boundary of said chamber and a second generally conical surface on said movable structure forming another boundary of said chamber confronting said first conical surface and spaced therefrom, said conical surfaces tapering at different angles and diverging from each other from a narrow spacing where said chamber communicates with said source to a wider spacing where said chamber communicates with said mold means, so that said conical surfaces (1) exert a wedging action on plasticized material in said chamber during the reduction in volume of said chamber to force plasticized material into said mold means and also (2) provide a restriction at said narrowly spaced portions thereof to inhibit flow of plasticized material from said chamber toward said source and thereby allow a higher pressure in said chamber than in said source.

5. A plastic molding apparatus as claimed in claim 1 in which said first structure is a fixed orifice bushing having an opening therein bounded by said first conical surface and said second structure is a movable mandrel having a portion located within said opening of said orifice bushing, which portion has said second conical surface thereon, and further including means for moving said mandrel.

6. A plastic molding apparatus as claimed in claim 5 in which said mold means in said second position contacts both said first and said second structures, said mold means including a core positioned to contact said second structure, said core slidably positioned in a bore of said mold means and mounted to be yieldingly biased against said second structure.

References Cited
UNITED STATES PATENTS

| | | | |
|---|---|---|---|
| 2,706,308 | 4/1955 | Lorenz | 18—5 X |
| 2,896,257 | 7/1959 | Norman et al. | 18—30 |
| 3,032,810 | 5/1962 | Soubier | 18—5 X |
| 3,169,275 | 2/1965 | Compton et al. | 18—30 |

WILBUR L. McBAY, Primary Examiner

U.S. Cl. X.R.

18—5